(12) United States Patent
Simon et al.

(10) Patent No.: US 6,195,648 B1
(45) Date of Patent: Feb. 27, 2001

(54) LOAN REPAY ENFORCEMENT SYSTEM

(76) Inventors: Frank Simon, 31959 Via Ararat, Bonsall, CA (US) 92003; Mike Simon, 2404 Gird Rd., Fallbrook, CA (US) 92028; Ron Mueller, 4027 Bonita View Dr., Bonita, CA (US) 91902

( * ) Notice: Subject to any disclaimer, the term of this patent is extended or adjusted under 35 U.S.C. 154(b) by 0 days.

(21) Appl. No.: 09/371,697

(22) Filed: Aug. 10, 1999

(51) Int. Cl.$^7$ .................................................. G06F 17/30
(52) U.S. Cl. .............................. 705/40; 705/13; 235/382; 235/384; 340/825.31; 340/825.33; 340/825.34
(58) Field of Search ........................ 705/13, 40; 235/382, 235/384; 340/825.31, 825.33, 825.34

(56) References Cited

U.S. PATENT DOCUMENTS

| | | |
|---|---|---|
| 3,665,397 | 5/1972 | De Napoli et al. . |
| 3,790,933 | 2/1974 | Cort . |
| 3,987,408 | 10/1976 | Sassover et al. . |
| 4,067,411 | 1/1978 | Conley et al. . |
| 4,177,466 | 12/1979 | Reagan . |
| 4,291,237 | 9/1981 | Kitano . |
| 4,327,353 | 4/1982 | Beard et al. . |
| 4,366,466 | 12/1982 | Lutz . |
| 4,381,705 | 5/1983 | Roes et al. . |
| 4,463,340 | 7/1984 | Adkins et al. . |
| 4,553,511 | 11/1985 | Hayakawa et al. . |
| 4,616,208 | 10/1986 | Nakamura . |
| 4,624,578 | 11/1986 | Green . |
| 4,630,201 * | 12/1986 | White .................................... 364/408 |
| 4,777,377 | 10/1988 | Jeter . |
| 4,804,937 | 2/1989 | Barbiaux et al. . |
| 4,805,722 | 2/1989 | Keating et al. . |
| 4,926,332 | 5/1990 | Komuro et al. . |
| 4,990,890 | 2/1991 | Newby . |
| 4,995,086 | 2/1991 | Lilley et al. . |
| 5,023,605 | 6/1991 | McColl . |
| 5,089,762 | 2/1992 | Sloan . |
| 5,124,920 | 6/1992 | Tamada et al. . |
| 5,289,369 * | 2/1994 | Hirshberg .............................. 364/401 |
| 5,396,215 | 3/1995 | Hinkle . |
| 5,491,325 * | 2/1996 | Huang et al. ......................... 235/379 |
| 5,519,260 | 5/1996 | Washington . |
| 5,594,284 * | 1/1997 | Hill et al. ............................. 307/10.5 |

(List continued on next page.)

FOREIGN PATENT DOCUMENTS

| | | | |
|---|---|---|---|
| 0320470 * | 6/1989 | (EP) | .............................. B60R/25/10 |
| 58-180349 | 10/1983 | (JP) . | |
| WO 96/19360 * | 6/1996 | (WO) | ............................ B60R/25/10 |

OTHER PUBLICATIONS

Bohn, "Anti–theft systems attract dealers", Automotive News, P.57. Dialog File 16, Access No. 02727658, 2/1993.*
White, J., "Repo Man's good news is bad for others—rise in delinquent car loans portends slowdown", Wall Street Journal, New York, 11/1988.*
Edgerton, J., "This antitheft device may cut your car insurance bill by up to 25%", Money, New York, 11/1997.*
Brewer, D., "Bad loans and legal remedies", Credit Union Management, Madison, Abstract, pp. 22–, 4/1996.*

*Primary Examiner*—Edward R. Cosimano
*Assistant Examiner*—Tongoc Tran
(74) *Attorney, Agent, or Firm*—Burns, Doane, Swecker & Mathis, L.L.P.

(57) ABSTRACT

A system to encourage on time repayment of loans includes electronic apparatus coupled to a critical system of certain equipment; for example, the ignition system of an automobile. Apparatus includes mechanism whereby a user-operator is able to enter a code. Entry of a correct code serves as indication that a payment has been made and enables further use of the equipment. On failure to timely make payments, a user is prevented from using the equipment as the apparatus is arranged to disable the equipment by way of the critical system to which it is coupled. Both a user-operator interface and critical system interruption circuit are coupled to a logic processor which is easily mounted onto equipment subject to the program.

2 Claims, 3 Drawing Sheets

U.S. PATENT DOCUMENTS

| | | | |
|---|---|---|---|
| 5,602,426 | * | 2/1997 | Ecker .................................. 307/10.2 |
| 5,631,962 | * | 5/1997 | Balph et al. ........................... 380/25 |
| 5,661,451 | | 8/1997 | Pollag . |
| 5,665,397 | | 9/1997 | Fisher et al. . |
| 5,686,765 | | 11/1997 | Washington . |
| 5,715,905 | | 2/1998 | Kaman . |
| 5,812,067 | | 9/1998 | Bergholz et al. . |
| 5,812,252 | | 9/1998 | Bowker et al. . |
| 5,819,869 | | 10/1998 | Horton . |
| 5,841,363 | * | 11/1998 | Jakob et al. .................... 340/825.31 |
| 5,867,802 | | 2/1999 | Borza . |
| 5,930,777 | * | 7/1999 | Barber .................................. 705/17 |
| 5,942,985 | * | 8/1999 | Chin ................................ 340/825.31 |
| 5,945,906 | * | 8/1999 | Onuma .............................. 340/425.5 |
| 5,964,877 | * | 10/1999 | Victor et al. .......................... 713/202 |
| 5,969,633 | * | 10/1999 | Rosler ............................ 340/825.34 |
| 5,973,411 | * | 10/1999 | Tado et al. .......................... 307/10.5 |

\* cited by examiner

LOAN REPAY ENFORCEMENT SYSTEM

BACKGROUND OF THE INVENTION

1. Field

The following invention disclosure is generally concerned with electronic systems for disabling equipment in response to failure to make timely payments on a corresponding loan.

2. Prior Art

Systems have been introduced to interrupt the ignition system of an automobile on a regular, timed interval. To re-enable the car, a user is required return to a payment center, make a payment, and have an agent reset the interrupt mechanism for a renewed timed interval. The system can only be reset by an authorized agent as it requires a key held in escrow at the payment center. While the system is effective in encouraging customers to repay their auto loans in timely fashion, it has extreme overhead considerations. The system requires a customer to travel to the payment center each payment period of the loan. Of course, this prevents the user from taking extended travel without first making an advanced payment. In addition, a user must arrive at the payment center during the hours in which it is open. Still further, a user must wait to receive the attention of the agent. As these problems pose considerable inconvenience, these systems suffer from limited utility. It is desirable to automate the reset process so a user is not required to travel to a payment center.

Monthly payments to utility companies are made with very high reliability. This is partly due to the threat of service cut-off. Failure to pay a phone bill, will result in loss of telephone services. Thus, phone bills are paid regularly because failure to do so has immediate and tangible results. Monthly payments on an automobile loan are not likely to be as regular. Although a car may be repossessed, the process is expensive and complex and thus the threat of doing so is less immediate than telephone service cut-off. To encourage reliable loan re-payments, it is desirable to have a 'service' cut-off for equipment related to loans.

Techniques have been discovered which provide very novel uses of automobile ignition interruption systems, particularly with respect to those which may be reset with minimal intrusion and burden upon a user's freedom. While systems and inventions of the art are designed to achieve particular goals and objectives, some of those being no less than remarkable, these inventions have limitations which prevent their use in new ways now possible. These inventions are not used and cannot be used to realize the advantages and objectives of the present invention.

SUMMARY OF THE INVENTION

Comes now, Frank Simon, Mike Simon, and Ron Mueller with an invention of a loan repayment system including devices for and methods of interrupting a critical system of equipment in response to failure to make timely payments.

A critical system interruption circuit in communication with a logic processing unit operates to disable and enable equipment in response to loan payments being timely made. When a user makes a payment on an outstanding loan, usually a loan related to the equipment, a logic processor is notified of the action. The logic processor drives a switch coupled to a critical system interruption means to enable or disable the equipment in accordance with payment receipt.

In some preferred versions, when a user makes a payment on an outstanding car loan, a code is released to the user. The user then operates a user-operator interface connected to a logic processing unit to convey the code. Once the code is verified, the logic processing unit manipulates the automobile ignition interruption circuit to enable the car.

In example, an ignition interruption circuit is arranged to disable and enable an automobile in response to loan payments being timely made. When a user makes a loan payment, the code is released to the user from a payment center. The user operates a user interface to convey the code to a logic processing unit. Upon verification, the logic processing unit operates an interruption circuit to enable the automobile for further use. Thus it becomes possible to interrupt service of equipment in response to failure to timely receive payments on a loan associated with the equipment.

In agreement, apparatus of the invention include: a critical system interruption circuit operable for enabling and disabling a critical system of certain equipment; a logic processing unit having a reference code generation and storage facility and comparator. And in some versions, a user interface operable for receiving a numeric code from a user and conveying that numeric code to the logic processing unit is included.

Methods of the invention may be summarized as those which include the steps: computing a payment due deadline, generating a reference code which corresponds to the deadline, receiving a code at a logic processing unit, comparing the received code to the reference code, disabling a critical system if a correct code is not received before a present time exceeds a payment due deadline; enabling a critical system on receipt of correct code; and computing subsequent payment due deadline and generating a reference code which corresponds to the subsequent deadline.

In some preferred uses of systems of the invention, a user who purchases a car from a dealer agrees to have the system installed on the purchased automobile to protect the lender from late payments on an outstanding loan. On initiation, parameters which relate to loan terms, for example total number of payments and payment interval, are loaded into a system memory from a server unit. The logic processing unit computes a deadline time which corresponds to the due date and time for receipt of a payment. When a user makes a payment on time in agreement with loan terms, the payment agency releases a predetermined alpha-numeric code to the user. The user then enters the code via a user interface so that the logic processing unit can process the code for verification. If the code matches a reference code stored or generated within the device, then the logic processing unit puts the ignition interruption circuit in a state which enables the car's ignition system. A user who fails to make a payment will not receive the code necessary to 'unlock' the system. If the user fails to enter the proper code by the time the deadline passes, the car is put into a disabled state by way of interruption of the ignition until payment is made. Thus the logic processing unit is provided an indication that timely payment was made via receipt of a correct code.

The invention thus stands in contrast to methods and devices known. The invention includes a critical system interruption mechanism which can be operated without being returned to the payment center. Systems of the art require returning to a payment center.

OBJECTIVES OF THE INVENTION

It is a primary object of the invention to provide systems to improve timely repayment of a loan.

It is an object of the invention to provide a system which can be operated without having to bring equipment to a predetermined location.

It is an object of the invention to provide systems to enable and disable equipment in response to receipt of loan payments.

It is a further object to provide systems which interrupt a critical system of equipment in response to a failure to receive a code in due time.

A better understanding can be had with reference to the detailed description of preferred embodiments and with reference to appended drawings. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

GLOSSARY

Figure 1:
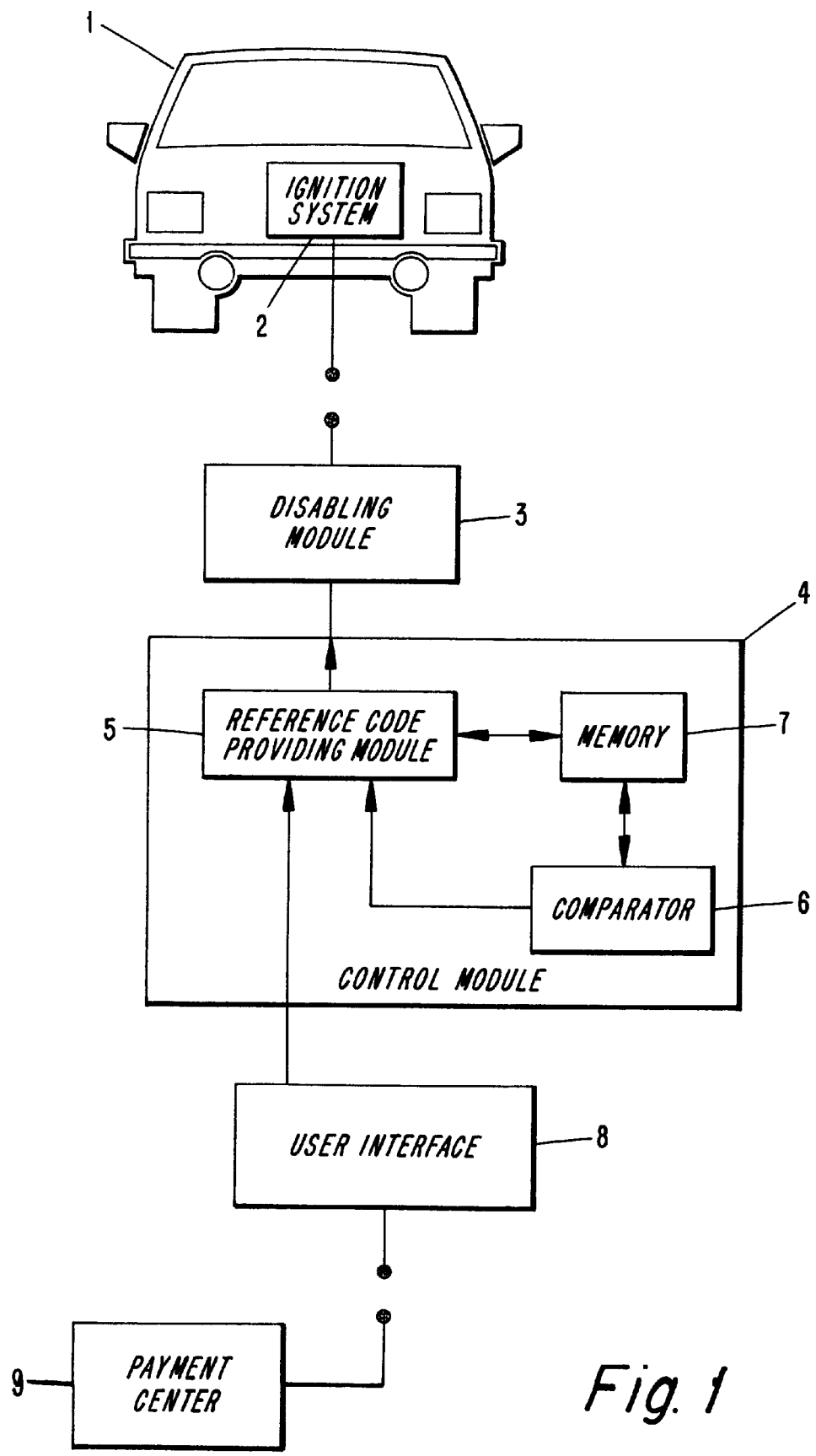
FIG. 1 is a block diagram which describes arrangement of elements in an apparatus of the invention.

Throughout this disclosure, reference is made to some terms which may or may not be exactly defined in popular dictionaries as they are defined here. To provide more precise disclosure, the following definition of terms are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within pertinent arts or by dictionary meaning. Where the presented definition is in conflict with a dictionary or arts definition, one must consider the context of use and liberal discretion to arrive at an intended meaning. One will be well advised to err on the side of attaching broader meanings to terms used in order to fully appreciate the depth of the teaching and to understand all intended variations.

Enable/Disable

Use of the word 'enable' or 'disable' means to cause a system to become operable or to cause a system to become inoperable in a temporary fashion whereby the state of operability may be toggled therebetween operable and inoperable states.

Payment Center

A payment center is a facility for receiving payments and dispensing codes in response to said receipt of payments. It may be an automatic or a partially automatic system whereby use of a database and dial-up access with electronic communication or radio frequency transmission of codes is fully anticipated.

Code

'Code' refers to any combination of numbers or letters or even symbols which may be represented in a digital domain such as in ASCII format; the code being represented in binary facilitates manipulation via computer processing means.

Critical System

'Critical system' refers to any system or sub-system which is necessary for the proper function of some related piece of equipment.

Ignition

'Ignition' refers to the entire electrical system of a car and all systems which support causing ignition in an engine. Although 'ignition' generally refers to the portion of electronics dedicated causing a spark to initiate combustion, for purposes of this invention, 'ignition' is to be taken quite broadly. For example, if a car is disabled because a fuel pump is rendered inoperative, or if a door or other security system is maintained in a locked condition, it is meant that 'ignition' is interrupted. One will appreciate that ignition does not occur when fuel is cut-off thus ignition is interrupted.

Logic Processing Unit

'Logic processing unit' refers to any logic processor, microcontroller, microprocessor or other computer type device operable for executing program code and performing logic operations without limitation to any particular type or class of processor.

Equipment

'Equipment' refers to machinery, instruments, and tools, both mechanical and electronic, which have systems or sub-systems which may be exposed to interruption. Equipment includes things like automobiles; machinery used in factories, such as conveyors and packaging tools; construction tools such as chain saws and jackhammers; instruments used in research facilities such as electron microscopes and spectrometers; and instruments used in hospitals, such as radiometers and gamma knives.

Automobile

The term 'automobile' is intended to include cars, trucks, tractors, cranes, boats, jet-skis, snowmobiles, motorcycles, recreational vehicles, airplanes et cetera. Each of these types of vehicles is comprised of an ignition system. Although in various parts of the invention reference is made to cars, it is to be appreciated that the invention works equally as well with other types of vehicles and thus automobile is to be interpreted without limit to cars but rather to any vehicle having an ignition system.

Nouns which are functional in nature or include the modifier: "means"

In addition to the terms described above, for purposes of this disclosure full meaning of certain nouns which are functional in nature, a 'functional noun', may be more readily appreciated in view of the following note.

A functional noun indicates that something is done, is caused, or simply occurs. Many forms of alternates may be used to accomplish the identical event. The particular choice of an object may be selected in view of a particular task at hand, however, in view of other tasks, one may choose a different object where both objects are useful in producing the mentioned function. Thus, it is not the object onto which importance be placed, but rather the function.

The essence of the invention is not changed by any particular choice of an object. Versions of the invention should not be limited to one particular type of object when a functional noun is used. The limitation described by functional noun is met when the function occurs. Therefore, by use of a functional noun it is meant that any conceivable means for causing the function is part of the invention. Experts will recognize many thousands of possible ways of accomplishing the identical function with alternative objects and it will not serve a further understanding of the invention to attempt to catalogue them. The reader will appreciate that the broadest possible definition of a functional noun is intended here. The following are examples of nouns used herein which are functional in nature:

Reference Code Providing Means

A reference code providing means is an device which provides a reference code to a logic control processor. It may be a simple array of numbers stored in conventional memory or may be program code which executes an algorithm to generate a reference code to be provided.

Comparison Means (comparator)

A comparison means, herein 'comparator', is a device for comparing a first code to a second code and returning a binary result in agreement with the comparison. The comparison may be one which tests for coincidence between codes or one which tests for cooperation between codes. For example, if the codes are identical a binary '1' can be returned or if the codes are different but merely cooperate under some rule, a binary '1' can be returned.

Interface Means

An 'interface means', herein 'user interface', is a device which allows a user to transmit to a logic processor a code.

Interruption Means

An 'interruption means', herein 'ignition interruption circuit' or 'ignition interruption mechanism', is a device which causes interruption of critical systems of equipment.

Terms which are functional in nature like those above may be used throughout this disclosure including the claims. For example, 'means for' or 'step for' followed by a phrase describing a function. One should remain mindful that any particular object provided as an example is not meant to limit the functional noun to that example but rather the example is provided to further illustrate certain preferred possibilities. Thus the 'means for' or 'step for' should not be limited to any particular structure which may be called out but rather to any conceivable means of causing the function described to be effected. The reader will recognize it is the function to be carried out which is the essence of the invention and many alternative means for causing the function to occur may exist without detracting from any combination or combinations taught as part of the invention.

Although preferred embodiments discussed here in detail are primarily directed to automobiles, one will appreciate that other types of equipment may be equally subjected to similar programs intended to protect a lender. For example, 'equipment' may include an air conditioner where a compressor is a critical system which may be interrupted. Alternatively, equipment may be an elevator having an control module as a critical system. Thus, operation of the elevator can be controlled in response to on-time loan payments. Any equipment which exposes a critical system to an interrupt means may be coupled to systems of this invention whereby operation of the equipment can be held as encouragement to repay loan payments in accordance with loan terms. Thus the true breadth of the invention should be limited only by the claims attached hereto without regard for particular examples set forth here for illustration.

PREFERRED EMBODIMENTS OF THE INVENTION

In accordance with each of the preferred embodiments of the invention, there is provided apparatus for and methods of a loan repayment system. It will be appreciated that each of the embodiments described include both an apparatus and a method and that the apparatus and method of one preferred embodiment may be different than the apparatus and method of another embodiment.

APPARATUS OF THE INVENTION

With reference to the drawing figures a full and complete appreciation of best modes of the invention can be gained.

FIG. 1 illustrates a block diagram of basic apparatus of the invention. An automobile 1 having a standard ignition system 2 is in electrical communication with a device of this invention. The device comprising: an ignition interruption mechanism 3; in communication with a logic processing unit 4; including a reference code providing means 5, a comparator 6, and a memory 7; is further in communication with a user interface 8. A payment center 9 which provides codes to a user is also depicted. Although the automobile and payment center are not considered elements of apparatus taught here, they relate intimately therewith thus they are shown via their relationship with elements of apparatus.

Critical System Interruption Circuit

An ignition interruption circuit may be coupled to ignition wires leading from a standard ignition keyswitch. In simplest terms, the ignition interruption mechanism may be described as a circuit breaking switch. Arranged serially, either switch, the keyswitch or the ignition interruption mechanism, will operate to cause an open circuit in the ignition primary rendering the ignition disabled. An ignition interruption circuit is further in communication with a logic processing unit. The logic processing unit operates the ignition interruption circuit in accordance with events which occur there. The logic processing unit generates commands to direct the ignition interruption circuit to take either of two alternative states. A 'disabled' state corresponds to an 'open' ignition circuit while an 'enabled' state corresponds to a 'closed' ignition circuit. The logic processing unit causes the ignition interruption circuit to switch between these two states.

User Interface

A user interface is coupled to the logic processing unit in order to convey to it a code. An alpha-numeric type code such as a PIN number for example, may be transmitted from the user interface to the logic processing unit for comparison to a reference code. While preferred versions of the invention include a simple keypad for tactile entry of a numeric code by a user, other versions are possible. Tumbler combination locks, slider element devices, and point-and-click user interfaces all are examples of alternative forms of user interfaces. A user interface is provided to allow a user to convey a code to a computer. Accordingly, use of an alternative user interface will not lend novelty to any version of an apparatus not explicitly presented here. A user interface allows a user in communication with a payment center to receive codes therefrom and cause those codes to be entered and transmitted to the logic processing unit for comparison.

Logic Processing Unit

A logic processing unit may be a microcontroller of a standard sort sometimes referred to as 'off-the-shelf' devices or alternatively may be a custom designed microcircuit having specific application. Although strictly speaking a 'logic processing unit' may be distinct from support elements such as a memory, for purposes of this disclosure 'logic processing unit' is used to refer to the entire computing facility which may include a memory, a comparator and other support elements. FIG. 1 shows this relationship where a reference code providing means 5 and a comparator 6 are presented within the bounds of the microcontroller 4. The logic processing unit may include other support elements such as power supply control, read-only memory, input-output facility, and other elements typically used in conjunction with microcontrollers or microprocessors. Logic processing units of the invention are set to execute code which is predetermined at an initialization step. As the preset code is not dynamic, the logic processing unit is not considered a user-programmable device. Its purpose is to execute coded instructions which enable the functionality described herein this disclosure.

A grace period may be included as part of the deadline for payment. Under terms of the loan, a payment becomes due at some discrete time. However, because of inconsistencies in the mails or other payment transmission difficulties, systems of the invention may be arranged to provide a grace period. A grace period allows equipment to operate normally after the time for payment has past but where no payment has been received, recorded, and reported via entry of a code. During the grace period, various indications and warnings may be provided to a user at the equipment. For example, a display may be arranged to deliver a message which indicates impending interruption. Alternatively, an audio signal may be provided to alert a user to the condition that payment is overdue.

One will appreciate that in rare cases of emergency, provision for override may be useful. For example, if a car is disabled for lack of timely payment, then a special code to be used only in case of emergency may temporarily re-enable the car. Thus a person in dire need of medical help may be transported with an otherwise disabled car when the emergency code is employed. By agreement, one can be charged heavy fines for misuse of emergency codes. In this way, non-emergency use is highly discouraged. The system is made secure against use outside designed limits while still accommodating occasional emergencies.

Fraudulent attempts to enable equipment may be accompanied by surreptitious entry of random codes. This may easily be detected at the logic processor and devices of the invention may be arranged to respond. When a predetermined number of bad code entries is detected, the system may be made to block further entry of codes. For example, when three consecutive bad codes are attempted, the system can be made to ignore further entry for a predetermined amount of time.

Some alternative versions of the invention omit use of a user interface. Where stationary equipment can easily be put into automatic communication with a payment center, for example via a simple telephone line connection, a user interface may be replaced by a modem and telephone line. The logic processing unit can then receive transmission of codes directly from the payment center without user input whatever. One will appreciate that there is nothing sacred about a telephone line hook-up and other communication means may work in similar fashion. Paging technology which transmits messages by radio frequency also works well. Equipment having a pager in communication with a logic processor unit could receive codes to activate the systems. Thus, any means of conveying a code from a payment center to a piece of equipment should be considered as part of the invention.

METHODS OF THE INVENTION

Figure 2:
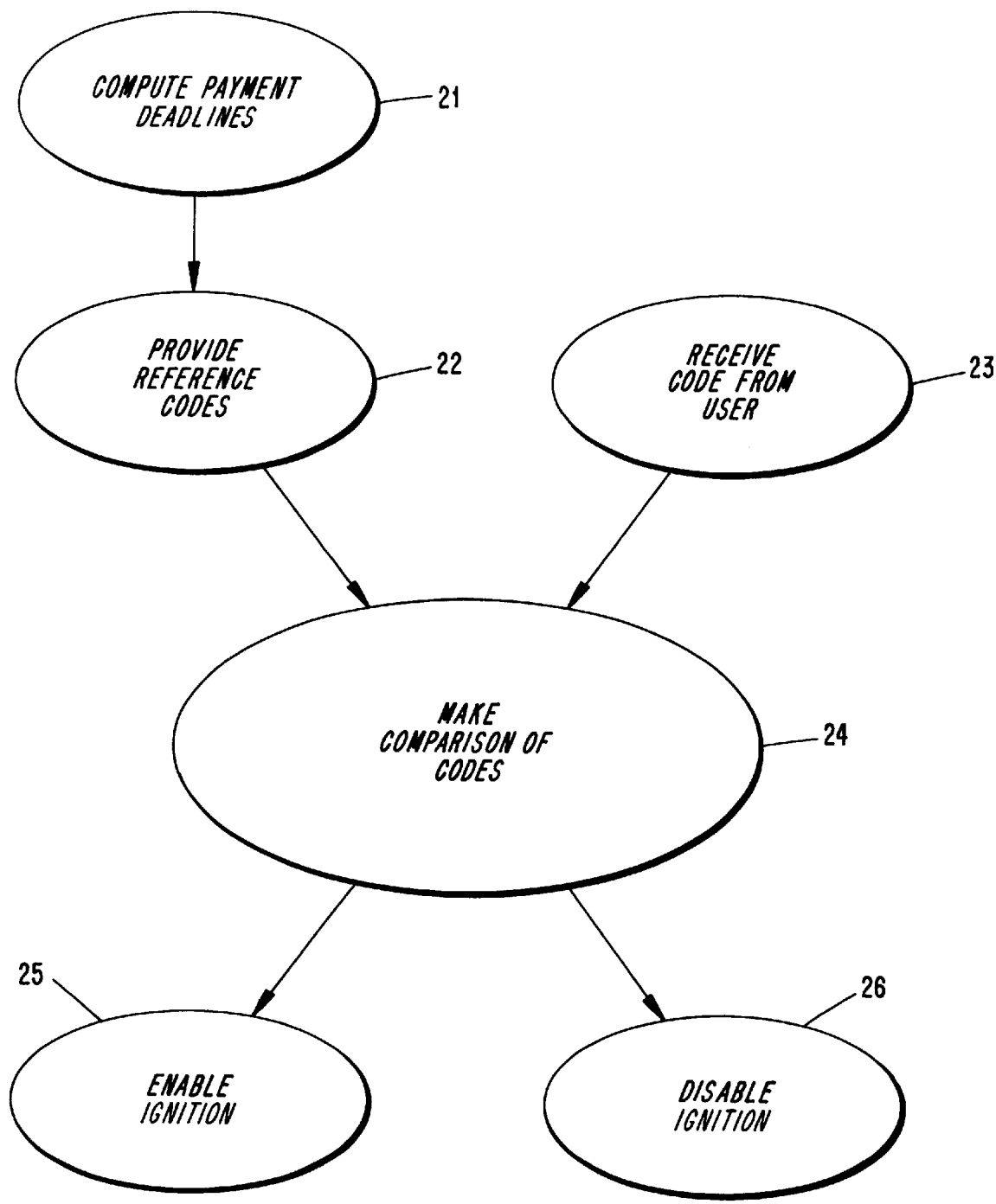
FIG. 2 is a block diagram which describes arrangement of steps in a method of the invention.

With reference to drawing FIG. 2, preferred methods of the invention include a step to compute a plurality of payment deadlines 21. In agreement with repayment terms of an automobile loan, a plurality of deadlines for receipt of payments is provided. Information relating to date and time of loan initialization, lifetime of the loan, total number of payments to be made, payment frequency, grace period, emergency override code, and perhaps other information (i.e. re-enable, reset procedures), is used for computing payment deadlines. A payment deadline represents the time by which a payment must be received at a payment center in order that the terms of the loan be met. Payment deadlines may be computed at initialization of the (loan) system or may be computed at various times thereafter initialization. In either case, deadlines computed may be used to generate reference codes.

In some versions of the invention, a host/client relationship is established with regard to computing facility. A host which may run software appropriate for systems administration can be connected to a client computing apparatus for downloading of important data like code schemes and particular deadlines. After initialization operations, the host may be separated from the client where the client has been programmed with important code information.

A logic processing unit includes facility to provide reference codes which correspond to computed deadlines. Algorithms used to generate reference codes are well known to the payment center which supplies corresponding codes to a user. A careful observer will note that the reference code provider may be arranged to merely store an array of reference codes generated in a set-up procedure during initialization of the system. The reference codes are then periodically recalled from the memory for a comparison step. As an alternative, it is possible to generate reference codes in real time in agreement with some algorithm. For example, a useful reference code may simply be a number equal to the number of days since a predetermined date set at initialization. In either case, the reference code providing means of the logic processing unit provides a reference code 22, whether it be from memory or one generated in real time, to a comparison means or comparator.

In a parallel step 23, a code may be received from a user. This may occur at any time prior to a present payment deadline without causing interruption of the ignition. A user having made a timely payment, that payment having been properly received and logged in the payment center, is entitled disclosure of the code which releases the mechanism from causing an interruption. In preferred embodiments, a user mails a payment to the payment center in advance of the deadline. When enough time has past for the center to have received and processed the payment, the user can call the payment center on a telephone and identify the loan. In response, the payment center can check its database and verify receipt of payment. After verification, the payment center will disclose to the user the code which can be used to release the timed interrupt mechanism. Having the code, the user can then enter it via the user interface of the device. Thus, in methods of the invention, a code from a user is received at a user interface.

A comparison of codes 24 is made in the logic processing unit. Upon receipt of a code entry from a user, the logic processing unit is triggered to perform a comparison of codes. The reference code which corresponds to an immediate payment deadline is compared to the code entered by the user. Either of two results drives the next step. If there is agreement between the codes, the logic processing unit operates the interruption circuit to leave the ignition enabled 25 without interruption. If there is no agreement between the user entered code and the reference code, then the logic processing unit operates the interruption circuit to cause the ignition to be disabled 26.

Figure 3:
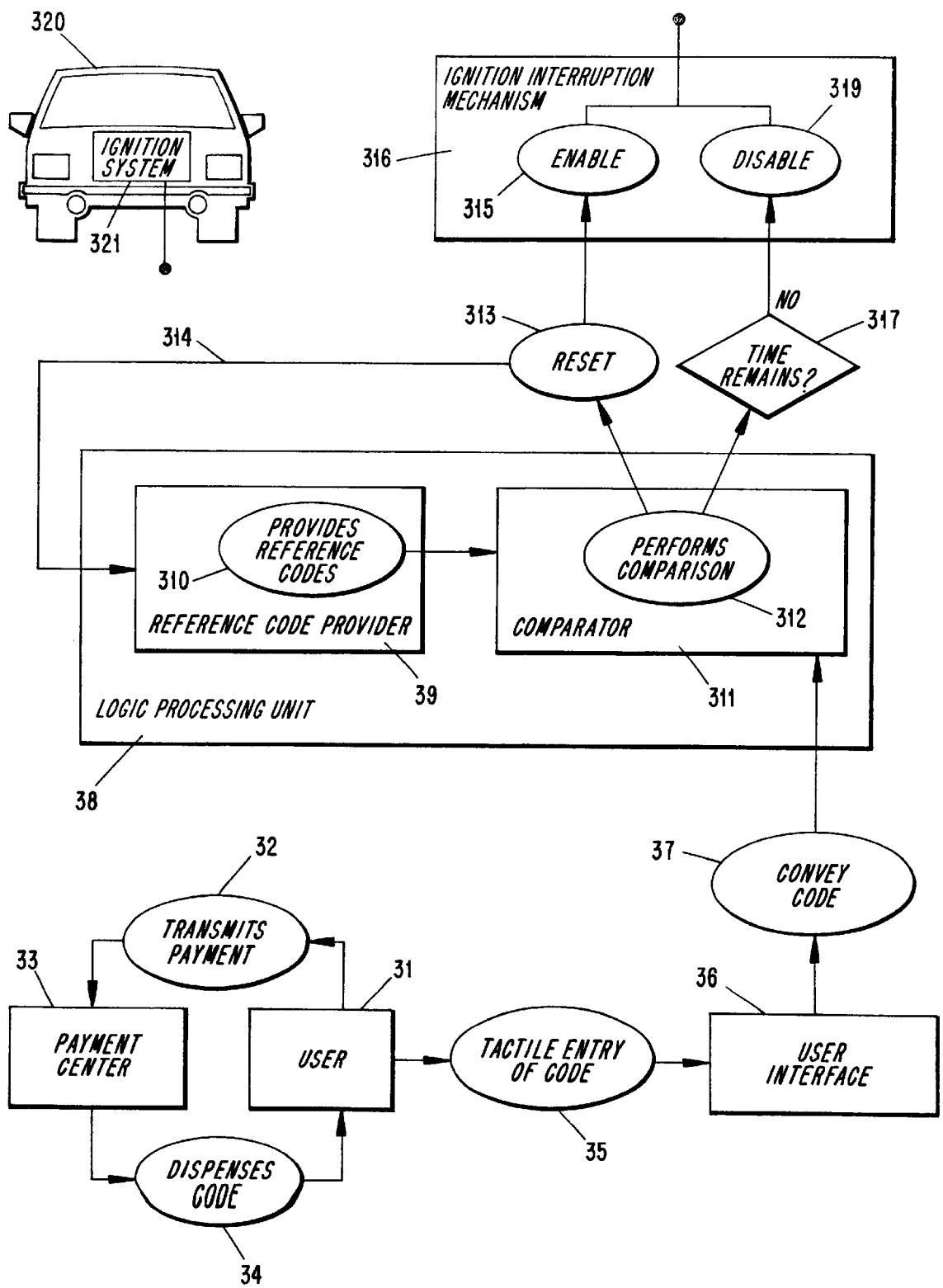
FIG. 3 is a block diagram which relates methods and apparatus together.

It is important to note that, if agreement exists between the entered and reference codes, the result of the comparison step sets a positive indicator in the logic processing unit, which indicator must be present at the occurrence of the payment deadline to avoid causing the ignition to be interrupted FIG. 3 illustrates one preferred version of the entire system with more precision where steps of methods are shown in their relationships with elements of devices. A user 31 causes a payment to be transmitted 32 to a payment center 33 where it is received and logged into records. In response to receipt of that payment, the payment center dispenses 34 a predetermined code to the user. The user then enters 35 the code via tactile entry upon a user interface 36 such as a simple keypad device. The user interface conveys 37 the code to the comparator portion of a logic processing unit 38. A reference code provider 39 provides 310 a reference code to the comparator 311. A comparison operation 312 is made to arrive at either of two distinct results. Either agreement is found with regard to the reference code and the code entered by the user, or no agreement is found. In the case of agreement, a reset operation 313 sends feedback 314 to the reference code provider to determine a new reference code which corresponds to the next payment deadline, while an enable 315 step causes the ignition interruption circuit 316 to be operated such that the ignition is enabled without regard to its prior state.

In the case where agreement is not found, an agreement indicator is left in a negative state. On arrival of a payment due deadline or end of a grace period a check of the state of the indicator is made. If the indicator is in a negative state, the ignition interruption circuit is operated to cause the ignition to be disabled 319. Devices of the invention may be coupled to an automobile 320 having a standard ignition 321.

In some preferred embodiments, when a payment deadline passes, a grace period begins. During the grace period, the user is notified via an indicator, for example a visual or an audio signal, that the grace period has been activated. During the grace period, the automobile remains operable and the ignition is not interrupted. However, the indicator serves as a warning of the impending interruption in service. If the grace period is exceeded and proper code has still not been entered, then the automobile is disabled. This embodiment is considered a mere subset of the above described systems. The grace period being a limited extension of time before interruption of the ignition occurs.

Alternative versions exist where the user interface is made redundant and is omitted entirely. For example, in the case of equipment which is an elevator or air conditioner a user interface can be eliminated and the system made automatic. A standard phone jack can be installed into the case of an air conditioner. Complete installation of the air conditioner includes plugging an active phone line into the jack. In this way, the logic processor of the air conditioner is put into communication with the payment center via a modem. The air conditioner can automatically be put into communication with the payment center on a periodic basis to receive codes which may be made available in response to receipt of payments.

One will now fully appreciate how an electronic device is arranged and operates to encourage timely loan payments by disabling an automobile ignition. Further, that the device may be reset remotely and does not require being physically present at a loan center to be properly reset. Although the present invention has been described in considerable detail with clear and concise language and with reference to certain preferred versions thereof including the best mode anticipated by the inventor, other versions are possible. Therefore, the spirit and scope of the invention should not be limited by the description of the preferred versions contained therein, but rather by the claims appended hereto.

What is claimed is:

1. A method of enabling and disabling a motor vehicle in response to payments being timely made, comprising the steps of:

computing a payment due deadline of a loan agreement for said motor vehicle;

generating a reference code which corresponds to said deadline;

providing said reference code to a comparator via a computer interface;

receiving an additional code, via a keypad, from a user;

passing said additional code to said comparator;

comparing said additional code with said reference code;

disabling a system which supports causing ignition in an engine of said motor vehicle, if agreement between said additional code and said reference code is not detected prior to said payment due deadline, wherein said system includes only components not dedicated to directly causing a spark to initiate combustion; and enabling said system if agreement between said additional code and said reference code is detected.

2. A system for enabling and disabling a motor vehicle in response to timely payments being made comprising:

a disabling module connected to a system that supports causing ignition in an engine of said motor vehicle;

a control module in communication with said disabling module; and means for periodically receiving a code from a keypad and transmitting said code to said control module, wherein said control module comprises:
a comparator;
a reference code providing module, said comparator being operable for comparing reference codes with received codes and triggering events in response thereto, and
said reference code providing module being operable for periodically providing reference codes to said comparator wherein said reference codes correspond to payments which are to be made;
wherein said disabling module disables the system that supports causing ignition when said code is not in agreement with said reference code before a predetermined time exceeds a predetermined deadline, and
wherein the system that supports causing ignition includes only components not dedicated to directly causing a spark to initiate combustion.

* * * * *

EX PARTE REEXAMINATION CERTIFICATE (5558th)

United States Patent
Simon et al.

(10) Number: US 6,195,648 C1
(45) Certificate Issued: Oct. 10, 2006

(54) LOAN REPAY ENFORCEMENT SYSTEM

(75) Inventors: Frank Simon, Bonsall, CA (US); Mike Simon, Fallbrook, CA (US); Ron Mueller, Bonita, CA (US)

(73) Assignee: Payment Protection Systems, Inc., Temecula, CA (US)

Reexamination Request:
No. 90/006,600, Apr. 10, 2003

Reexamination Certificate for:
Patent No.: 6,195,648
Issued: Feb. 27, 2001
Appl. No.: 09/371,697
Filed: Aug. 10, 1999

(51) Int. Cl.
*G06Q 40/00* (2006.01)

(52) U.S. Cl. .......................... 705/40; 705/13; 235/382; 235/384; 340/5.31; 340/5.54

(58) Field of Classification Search ..................... None
See application file for complete search history.

(56) References Cited

U.S. PATENT DOCUMENTS

| | | |
|---|---|---|
| 3,665,397 A | 5/1972 | De Napoli et al. |
| 3,790,933 A | 2/1974 | Cort |
| 3,987,408 A | 10/1976 | Sassover et al. |
| 4,067,411 A | 1/1978 | Conley et al. |
| 4,177,466 A | 12/1979 | Reagan |
| 4,291,237 A | 9/1981 | Kitano |
| 4,327,353 A | 4/1982 | Beard et al. |
| 4,335,370 A | 6/1982 | Scalley et al. ................ 340/64 |
| 4,366,466 A | 12/1982 | Lutz |
| 4,381,705 A | 5/1983 | Roes et al. |
| 4,463,340 A | 7/1984 | Adkins et al. |
| 4,484,217 A | 11/1984 | Block et al. |
| 4,553,511 A | 11/1985 | Hayakawa et al. |
| 4,616,208 A | 10/1986 | Nakamura |
| 4,624,578 A | 11/1986 | Green ......................... 368/10 |
| 4,630,201 A | 12/1986 | White |
| 4,700,296 A | 10/1987 | Palmer, Jr. et al. ......... 364/410 |
| 4,777,377 A | 10/1988 | Jeter |
| 4,804,937 A | 2/1989 | Barbiaux et al. |
| 4,805,722 A | 2/1989 | Keating et al. |
| 4,908,629 A | 3/1990 | Apsell et al. |
| 4,926,332 A | 5/1990 | Komuro et al. |
| 4,990,890 A | 2/1991 | Newby |
| 4,995,086 A | 2/1991 | Lilley et al. |
| 5,023,605 A | 6/1991 | McColl |

(Continued)

FOREIGN PATENT DOCUMENTS

| | | |
|---|---|---|
| EP | 0320470 A2 | 6/1989 |
| EP | 635408 A1 | 1/1999 |
| JP | S58-180349 | 10/1983 |
| WO | WO96/19360 | 6/1989 |
| WO | WO 96/16845 | 6/1996 |

OTHER PUBLICATIONS

Article: Pager Lets You Locate Your Car, Unlock and Start It:, published Dec. 10, 1997 in USA Today.
Article: "Electronic Keys Keep Tabs on Late Payers", published Dec. 22, 1997 in *Nonprime Auto News*.
"PASSTEC Device Safely Prevents Vehicles from Starting", published Jul. 19, 1999 in *Used Car News*.

(Continued)

*Primary Examiner*—Beverly M. Flanagan

(57) ABSTRACT

A system to encourage on time repayment of loans includes electronic apparatus coupled to a critical system of certain equipment; for example, the ignition system of an automobile. Apparatus includes mechanism whereby a user-operator is able to enter a code. Entry of a correct code serves as indication that a payment has been made and enables further use of the equipment. On failure to timely make payments, a user is prevented from using the equipment as the apparatus is arranged to disable the equipment by way of the critical system to which it is coupled. Both a user-operator interface and critical system interruption circuit are coupled to a logic processor which is easily mounted onto equipment subject to the program.

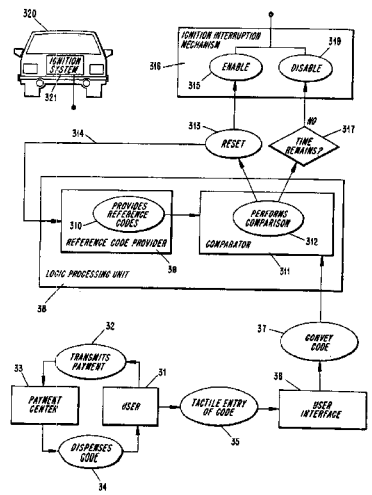

U.S. PATENT DOCUMENTS

| | | | |
|---|---|---|---|
| 5,089,762 | A | 2/1992 | Sloan |
| 5,124,920 | A | 6/1992 | Tamada et al. |
| 5,220,501 | A | 6/1993 | Lawlor et al. |
| 5,287,266 | A | 2/1994 | Malec et al. |
| 5,289,369 | A | 2/1994 | Hirshberg |
| 5,291,554 | A | 3/1994 | Morales |
| 5,396,215 | A | 3/1995 | Hinkle |
| 5,451,925 | A | 9/1995 | Le |
| 5,481,253 | A | 1/1996 | Phelan et al. |
| 5,490,200 | A | 2/1996 | Snyder et al. |
| 5,491,325 | A | 2/1996 | Huang et al. |
| 5,495,531 | A | 2/1996 | Smiedt ..................... 380/4 |
| 5,510,780 | A | 4/1996 | Norris et al. .......... 340/825.56 |
| 5,519,260 | A | 5/1996 | Washington |
| 5,548,164 | A | 8/1996 | Hillard et al. |
| 5,557,254 | A | 9/1996 | Johnson et al. |
| 5,585,613 | A | 12/1996 | Bell et al. |
| 5,594,284 | A | 1/1997 | Hill et al. |
| 5,602,426 | A | 2/1997 | Ecker |
| 5,631,962 | A | 5/1997 | Balph et al. |
| 5,661,451 | A | 8/1997 | Pollag |
| 5,665,397 | A | 9/1997 | Fisher et al. |
| 5,686,765 | A | 11/1997 | Washington |
| 5,715,905 | A | 2/1998 | Kaman |
| 5,733,219 | A | 3/1998 | Rettig et al. |
| 5,742,227 | A | 4/1998 | Escareno et al. |
| 5,775,290 | A | 7/1998 | Staerzl et al. ............... 123/335 |
| 5,812,067 | A | 9/1998 | Bergholz et al. |
| 5,812,252 | A | 9/1998 | Bowker et al. |
| 5,819,869 | A | 10/1998 | Horton |
| 5,841,363 | A | 11/1998 | Jakob et al. |
| 5,867,802 | A | 2/1999 | Borza |
| 5,880,679 | A | 3/1999 | Lenart et al. |
| 5,903,653 | A | 5/1999 | Ross et al. |
| 5,912,512 | A | 6/1999 | Hayashi et al. |
| 5,917,405 | A | 6/1999 | Joao |
| 5,930,777 | A | 7/1999 | Barber |
| 5,942,985 | A | 8/1999 | Chin |
| 5,945,906 | A | 8/1999 | Onuma |
| 5,964,877 | A | 10/1999 | Victor et al. |
| 5,969,633 | A | 10/1999 | Rösler ................... 340/825.34 |
| 5,973,411 | A | 10/1999 | Tado et al. |
| 6,021,399 | A | 2/2000 | Demers et al. |
| 6,025,774 | A | 2/2000 | Forbes |
| 6,043,568 | A | 3/2000 | Matsumoto et al. |
| 6,043,752 | A | 3/2000 | Hisada et al. |
| 6,073,064 | A | 6/2000 | Konrad et al. |
| 6,073,124 | A | 6/2000 | Krishnan et al. |
| 6,124,805 | A | 9/2000 | Gabbard |
| 6,157,317 | A | 12/2000 | Walker |
| 6,259,168 | B1 | 7/2001 | Okada |
| 6,380,848 | B1 | 4/2002 | Weigl et al. ................ 340/426 |

OTHER PUBLICATIONS

Payment Clock Disabler advertisement (from Internet) published May 18, 1998.

Payment Clock Disabler advertisement (from internet) archived Jan. 28, 1999.

Article: "Electronic Keys Keep Tabs on Late Payers," Dec. 22, 1997, *Nonprime Auto News*.

"PASSTEC Device Safely Prevents Vehicles from Starting," Jul. 19, 1999, *Used Car News*.

Payment Clock Disabler advertisement (obtained from Internet, published on May 18, 1998).

Payment Clock Disabler advertisement (obtained from Internet, archived on Jan. 28, 1999).

Bohn, "Anti–theft systems attract dealers", Automotive News, p. 57. Dialog File 16, Access No. 02727658. Feb. 1993.

White, J., "Repo Man's good news is bad for others—rise in delinquent car loans portends slowdown", Wall Street Journal, New York. Nov. 1988.

Edgarton, J., "This antitheft device may cut your car insurance bill by up to 25%", Money, New York. Nov. 1997.

Brewer, D., "Bad loans and legal remedies", Credit Union Management, Madison, Abstract, p. 22. Apr. 1996.

Royal News Corp., "Elite to Unveil High–Tech Car Tracking, Monitoring System", Nonprime Auto News, pp. 1 and 9 vol. 3, No. 7. Feb. 8, 1999.

"Save Money with Autostop 2000," Futurtech Associates Inc., Orlando, Florida, pp. GH 01224–GH 01229.

"Why Your Customers Should Want Paycteck," Pay Technologies, Ltd., Cleveland, Ohio, pp. GH 01212–GH 01216.

"Pay Technologies Inc.," Jun. 8, 1997, pp. GH 01210–GH 01211.

Earle Eldridge, "Pager Lets You Locate Your Car, Unlock and Start It," USA Today.

"Cars Lock, Unlock Through Paper", "Auto Schools Combine Forces", "Big Borther May be Watching", "Dealerships Help Fund Schools," Automotive Executive, Feb. 1998, p. GH 01208.

"Press Release, If you are a High Risk Lender or Buy Here Pay Here Auto Dealership You Can't Afford Not to Read This," Fremont, Ohio, pp. GH 01206–GH 01207.

Deposition of Delavan Smith, Civil Action No. 02–D–517 (MJW), pp. 1–171, May 12, 2003, Fort Myers, FL.

Expert Report of Del Smith, Civil Action No. 02–D–517 (MJW), pp. 1–12 and Appendices 1–12, Apr. 12, 2003.

Expert Report of Dan Martin, Civil Action No. 02–D–0517 (MJW), pp. 1–17 and Exhibits A–D, Apr. 11, 2003.

Third Amended Complaint, Civil Action No. 02–D–517 (MJW), pp. 1–14, Jul. 16, 2003.

Supplementary Response to Payment Protection Systems' Interrogatory Nos. 2, 8, 9, 10, 11, and 13 to Gordon–Howard, Civil Action No. 02–D–517 (MJW), 15 pages, Feb. 18, 2003.

Rebuttal Expert Report of Scott A. Kliger, Civil Action No. 02–D–0517 (MJW), pp. 1–25 & Certificate of Service.

Supplemental Expert Report of Scott A. Kliger, Civil Action No. 02–D–0517 (MJW), pp. 1–23 & Certifice of Service.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 2 is confirmed.

New claims 3–9 are added and determined to be patentable.

3. *The method according to claim 1, further comprising the steps of:*

*computing a subsequent payment due deadline if agreement between said additional code and said reference code is detected; and*

*generating a new reference code which corresponds to the subsequent deadline.*

4. *The method according to claim 1, wherein said payment due deadline is used to generate said reference code.*

5. *The method according to claim 1, wherein said reference code is generated in real time using an algorithm.*

6. *The method according to claim 1, wherein said additional code may be received at any time prior to a present payment due deadline.*

7. *The method according to claim 1, wherein agreement between said additional code and said reference code is detected if said additional code and said reference code are different, but cooperate under a rule.*

8. *The system according to claim 2, wherein said reference code providing module comprises program code which executes an algorithm to generate said reference codes.*

9. *The system according to claim 2, wherein said reference code providing module generates a new reference code which corresponds to a next payment due deadline when said received code is in agreement with said reference code.*

\* \* \* \* \*

(12) EX PARTE REEXAMINATION CERTIFICATE (6336th)
United States Patent
Simon et al.

(10) Number: US 6,195,648 C2
(45) Certificate Issued: Jul. 29, 2008

(54) LOAN REPAY ENFORCEMENT SYSTEM

(75) Inventors: Frank Simon, Bonsall, CA (US); Mike Simon, Fallbrook, CA (US); Ron Mueller, Bonita, CA (US)

(73) Assignee: Payment Protection Systems, Inc., Temecula, CA (US)

Reexamination Request:
No. 90/008,296, Oct. 20, 2006

Reexamination Certificate for:
Patent No.: 6,195,648
Issued: Feb. 27, 2001
Appl. No.: 09/371,697
Filed: Aug. 10, 1999

Reexamination Certificate C1 6,195,648 issued Oct. 10, 2006

(51) Int. Cl.
*G06Q 40/00* (2006.01)

(52) U.S. Cl. ............................ 705/40; 705/13; 235/382; 235/384; 340/5.31; 340/5.54

(58) Field of Classification Search ........................ None
See application file for complete search history.

(56) References Cited

U.S. PATENT DOCUMENTS

| | | |
|---|---|---|
| 5,276,728 A | 1/1994 | Pagliaroli et al. |
| 5,850,599 A | 12/1998 | Seideman |
| 5,917,405 A * | 6/1999 | Joao ...................... 340/426.17 |
| 6,025,774 A * | 2/2000 | Forbes ................... 340/426.19 |
| 6,611,201 B1 | 8/2003 | Bishop et al. |
| 6,647,328 B2 | 11/2003 | Walker |
| 6,664,888 B1 | 12/2003 | Bishop et al. |
| 6,731,195 B2 * | 5/2004 | Nemoto ..................... 340/5.2 |

FOREIGN PATENT DOCUMENTS

| | | |
|---|---|---|
| EP | 0 371 451 A | 6/1990 |
| EP | 0 451 482 A1 | 10/1991 |
| WO | 97/45822 A | 12/1997 |

OTHER PUBLICATIONS

Supplementary European Search Report issued in corresponding EP 99973978.2 on Jul. 20, 2007.

* cited by examiner

*Primary Examiner*—Beverly M. Flanagan

(57) ABSTRACT

A system to encourage on time repayment of loans includes electronic apparatus coupled to a critical system of certain equipment; for example, the ignition system of an automobile. Apparatus includes mechanism whereby a user-operator is able to enter a code. Entry of a correct code serves as indication that a payment has been made and enables further use of the equipment. On failure to timely make payments, a user is prevented from using the equipment as the apparatus is arranged to disable the equipment by way of the critical system to which it is coupled. Both a user-operator interface and critical system interruption circuit are coupled to a logic processor which is easily mounted onto equipment subject to the program.

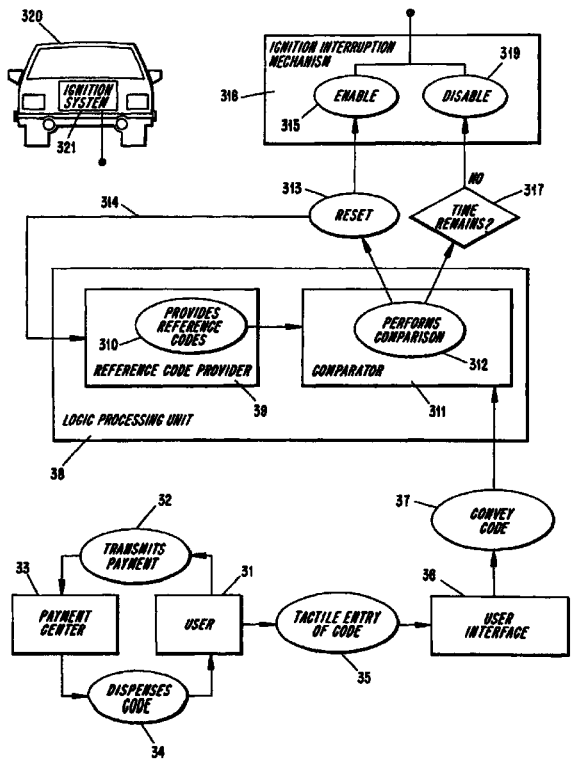

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

* * * * *